Patented June 23, 1925.

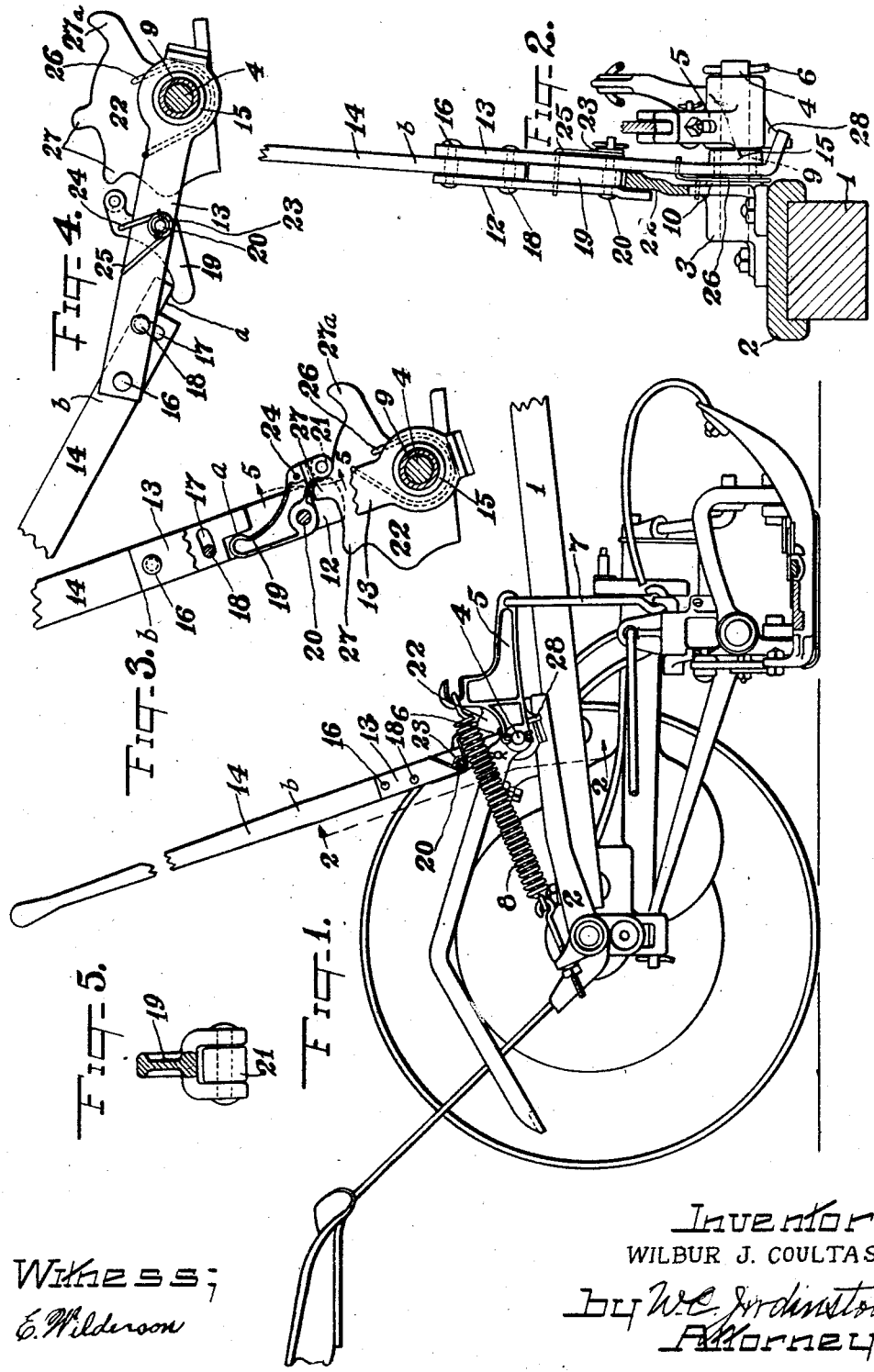

1,543,422

UNITED STATES PATENT OFFICE.

WILBUR J. COULTAS, OF MOLINE, ILLINOIS, ASSIGNOR TO DEERE & COMPANY, OF MOLINE, ILLINOIS, A CORPORATION OF ILLINOIS.

LEVER.

Application filed July 5, 1923. Serial No. 649,414.

*To all whom it may concern:*

Be it known that I, WILBUR J. COULTAS, a citizen of the United States, residing at Moline, in the county of Rock Island and State of Illinois, have invented certain new and useful Improvements in Levers, of which the following is a specification, reference being had therein to the accompanying drawing.

My invention relates to levers, and while I have shown my invention as applied to a mower, my object is to provide a lever applicable to various types of machines and possessing certain novel features by which it is made more effective in operation, as clearly disclosed in the following specification.

Referring to the drawings in which similar numerals indicate identical parts—

Figure 1 is a side elevation of a mower having my device mounted thereon and the rear wheel removed. Figure 2 is a detail rear view on the line 2—2 of Figure 1. Figure 3 is a detail side elevation of the lever, part being broken away to clearly show the detent. Figure 4 is a side elevation showing the position of the parts when the lever is at the limit of its rearward movement and about to be swung forwardly, and Figure 5 is a detail section on the line 5—5 of Figure 3.

A tongue 1 is bolted to a part 2 of a mower frame and upon the latter is mounted a support 3 in which is rigidly secured a stub shaft 4. A rocking lever 5 is loosely supported on the shaft 4 and is held thereon by a cotter 6. The forward end of the lever 5 is connected to the cutting mechanism of the mower by a link 7, and to a central vertical arm of the lever 5 a coiled spring 8 is attached and extends rearwardly to connection with a part of the mower frame, the rocking lever 5 and its connections stated are well known in the art and are illustrated and described in relation to one application of my invention. A short sleeve 9, integral with the lever 5, contacts with a boss 10 on the support 3 and on the sleeve 9 I mount my lever *a* which is composed of two sections, the lower section made of flat bars 12 and 13, and the upper section is the manually operated bar 14.

The bar 13 is enlarged at its lower portion and is provided with a hub 15 loosely enclosing the sleeve 9. The bars 12 and 13 are parallel and spaced apart and between them is pivotally mounted, on a bolt or rivet 16, the bar 14 having a slot 17 through which extends a rivet 18 fastened in the bars 12 and 13. A detent 19 is pivotally mounted intermediate its ends, between the bars 12 and 13, on a bolt 20 in the bars 12 and 13 and secured in place preferably by a cotter. The upper end of the detent 19 is rounded and is in constant contact with the bar 14 at *a*, the rear of the bar 14 at this point being cut away as shown to form, with the adjacent sides of the bars 12 and 13, a recess for the upper end of the detent 19. The lower end of the detent 19 is bifurcated, as shown in Figure 5, and therein is supported a roller 21 which is adapted to engage with notches in an arcuate rack 22 integral with the support 3 and extending between the bars 12 and 13.

A spring 23 is coiled about the bolt 20 and has one end 24 fastened to the lower part of the detent 19, and the remaining end 25 is bent to engage with a notch in the forward edge of the bar 13, the expansive force of the spring holding the detent in operative position. A similar spring 26 around the boss 10 has an end bent for insertion in a suitable orifice in the side of the arcuate rack 22, and its opposite end connected to the forward edge of the bar 13, the force of the spring 26 assisting to hold the lever in its various positions of adjustment.

The teeth 27 of the arcuate rack 22 are rounded forwardly to allow the roller 21 to readily travel over them when the lever is rocked rearwardly, the rear edge of the teeth 27 being formed to prevent travel of the roller and to hold the detent until released by actuation of the bar 14.

As shown in Figures 1, 2 and 3 the lever, composed of the bars 12, 13 and 14 is in a neutral position, that is, there is no pulling force operating against the lever, the spring 26 acting to hold the lever in this position and lacking the force to rock the lever further rearward and rock the detent 19 over the adjacent tooth 27. To raise the cutter bar of a mower, to which my lever is shown connected, the bar 13 has its lower end bent to contact with an abutment 28 on the lower side of the lever 5 whereby the lever 5 is rocked upwardly to raise the cutter bar by rearward swing of the lever *a*. In swinging the lever *a* rearwardly, the roller 21 travels over the teeth of the arcuate rack 22 until the desired effect of this operation of the lever *b* has been attained, the roller 21 contacting with the rear of the adjacent tooth 27 and holding the lever *a* in position.

In swinging the lever *a* forward the bar 14 is rocked on its pivot 16 until stopped by the forward end of the slot 17; during this movement the detent 19 is also rocked on its pivot 20, by pressure from the lower end of the bar 14, and further forward actuation of the bar 14 will also carry the bars 12 and 13 forwardly, the roller 21 readily passing over the teeth 27 until the purpose, for which the lever *b* has been moved, has been attained or until the roller contacts with the forward tooth 27ª which is of sufficient length to prevent the detent from passing beyond it. The position of the parts illustrating the beginning of the operation of moving the lever forwardly is fully shown in Figure 4, and after this movement is completed and the hand of the operator has been removed from the lever the expansive force of the spring 23 is exercised to rock the detent 19, and the bars 14 and 12 and 13 are again in alinement and the detent 19 in relative position therewith.

My invention is applicable to various types of machines and is thoroughly effective wherever used. The detent requires no attention from the operator but is automatic in its action and readily engages with the rack teeth or is disengaged therefrom, accommodating its action to the movement of the lever.

What I claim is—

In a lever, the combination of an upper and a lower section, the lower section pivotally mounted on a support, and the upper section pivotally attached intermediate its ends to the lower section and having a rearward recess at its lower end, said sections normally in alinement and when the lever is moved in one direction, an arcuate rack on the support, a detent pivotally mounted intermediate its ends on the lower section, its lower end engaging with said rack and its upper end in constant contact with said upper section within the recess therein, and a spring coiled about the pivot of said detent having one of its ends connected to said detent below the pivot thereof and its opposite end bent to engage with the forward edge of the lower section whereby said detent is held in operative position relative to the upper section of the lever and the arcuate rack.

WILBUR J. COULTAS.